(12) United States Patent
Costas

(10) Patent No.: US 9,976,695 B2
(45) Date of Patent: May 22, 2018

(54) HOLDER FOR SUPPORTING MEDIA SHEET

(71) Applicant: Eric Costas, Cremorne (AU)

(72) Inventor: Eric Costas, Cremorne (AU)

( * ) Notice: Subject to any disclaimer, the term of this patent is extended or adjusted under 35 U.S.C. 154(b) by 0 days. days.

(21) Appl. No.: 13/673,571

(22) Filed: Nov. 9, 2012

(65) Prior Publication Data
US 2013/0200228 A1 Aug. 8, 2013

(30) Foreign Application Priority Data

Nov. 14, 2011 (AU) ................................ 2011904741

(51) Int. Cl.
A47B 96/06 (2006.01)
F16M 13/02 (2006.01)
G06F 1/16 (2006.01)

(52) U.S. Cl.
CPC ........... *F16M 13/02* (2013.01); *G06F 1/1611* (2013.01); *A47B 2200/0094* (2013.01)

(58) Field of Classification Search
CPC ..... B42F 1/02; B42F 1/06; B42F 1/10; B42D 17/00; B42D 17/005; B41J 29/15; A47B 21/045; A47B 2200/0094; G06F 1/1611; G06F 1/1607
USPC ............ 24/67.1, 67.3, 67.9, 67.11, 545, 547, 24/67 R; 248/442.2, 451, 452, 453, 918, 248/316.7, 447
See application file for complete search history.

(56) References Cited

U.S. PATENT DOCUMENTS

| | | | | |
|---|---|---|---|---|
| 26,461 A * | 12/1859 | Sassenhoff | ............ | B60G 11/113 267/52 |
| 819,504 A * | 5/1906 | Benedict | ........................ | 24/67.9 |
| 1,615,959 A * | 2/1927 | Slavik | ......................... | 248/442.2 |
| 1,744,560 A * | 1/1930 | Lukacs | ............................ | 40/360 |
| 1,893,594 A * | 1/1933 | Oestreich | .................. | G09F 1/10 108/28 |
| 2,328,471 A * | 8/1943 | Leffel | ............... | 108/6 |
| 2,779,114 A * | 1/1957 | Orthwine | .................. | G09F 1/10 273/150 |
| 2,938,252 A * | 5/1960 | Scheemaeker | ................. | 24/67.9 |
| 3,181,448 A * | 5/1965 | Hemenway | ..................... | 355/82 |
| 3,207,319 A * | 9/1965 | Best | ................................ | 211/48 |
| 4,197,026 A * | 4/1980 | Vorbach et al. | .............. | 400/718 |
| 4,332,364 A * | 6/1982 | Beskin | ......................... | 248/442.2 |
| 4,501,438 A * | 2/1985 | McKee | ............................ | 281/45 |
| D279,991 S * | 8/1985 | Lehman | ......................... | D19/21 |
| 4,632,471 A * | 12/1986 | Visnapuu | ...................... | 312/233 |

(Continued)

FOREIGN PATENT DOCUMENTS

DE 202008003041 U1 8/2008
EP 1095593 A1 5/2001

OTHER PUBLICATIONS

Examination Report issued in related application AU2012247079, dated Dec. 20, 2013, 3 pages.

(Continued)

*Primary Examiner* — Kimberly T Wood
(74) *Attorney, Agent, or Firm* — Fox Rothschild LLP

(57) ABSTRACT

A holder for supporting one or more media sheets with respect to a monitor, the holder comprising a body a plurality of retainers, the retainers being configured such that in use a media sheet is biased by the retainer into contact with the body so as to be supported in facing relationship with the body and a connector adapted to connect the body with the monitor.

3 Claims, 21 Drawing Sheets

(56) References Cited

U.S. PATENT DOCUMENTS

| | | | | |
|---|---|---|---|---|
| 4,693,443 | A * | 9/1987 | Drain | B41J 29/15 |
| | | | | 211/89.01 |
| 4,747,572 | A | 5/1988 | Weber | |
| 4,790,680 | A * | 12/1988 | Givati et al. | 402/68 |
| 4,836,489 | A * | 6/1989 | Chu | 248/442.2 |
| 4,869,565 | A * | 9/1989 | Bachman | 312/234 |
| 4,902,078 | A * | 2/1990 | Judd | 312/7.2 |
| 4,934,648 | A * | 6/1990 | Yueh | 248/442.2 |
| 5,010,629 | A * | 4/1991 | Hirzel | 24/67.9 |
| 5,044,593 | A * | 9/1991 | Jones | 248/442.2 |
| 5,067,681 | A * | 11/1991 | Huang et al. | 248/442.2 |
| 5,074,512 | A * | 12/1991 | Gianforcaro et al. | 248/442.2 |
| 5,078,358 | A * | 1/1992 | Egly et al. | 248/447.1 |
| 5,082,235 | A * | 1/1992 | Crowther et al. | 248/231.41 |
| 5,104,088 | A | 4/1992 | Bakanowsky, III | |
| 5,194,904 | A * | 3/1993 | Ruch | 399/397 |
| 5,226,215 | A * | 7/1993 | Evenson | 24/67.5 |
| 5,292,099 | A * | 3/1994 | Isham et al. | 248/442.2 |
| 5,398,384 | A * | 3/1995 | Rinard | 24/67.9 |
| 5,499,793 | A * | 3/1996 | Salansky | 248/442.2 |
| 5,505,421 | A * | 4/1996 | Marthaler | A47B 21/045 |
| | | | | 248/442.2 |
| 5,533,702 | A * | 7/1996 | Koch | 248/442.2 |
| 5,549,268 | A * | 8/1996 | Hopwood | 248/442.2 |
| 5,697,594 | A * | 12/1997 | Adams et al. | 248/442.2 |
| 5,725,191 | A * | 3/1998 | Nemeth | 248/442.2 |
| 5,845,889 | A * | 12/1998 | Suzuki | 248/451 |
| 5,855,351 | A * | 1/1999 | Cziraky | A47B 97/04 |
| | | | | 248/451 |
| 5,901,937 | A * | 5/1999 | Compeau et al. | 248/442.2 |
| 5,931,437 | A * | 8/1999 | Neuhof et al. | 248/442.2 |
| 5,975,478 | A * | 11/1999 | Marino | 248/442.2 |
| 6,003,259 | A * | 12/1999 | Krapf et al. | 40/658 |
| 6,199,814 | B1 | 3/2001 | Lee | |
| 6,209,246 | B1 * | 4/2001 | Schwartz | 40/642.01 |
| 6,286,800 | B1 * | 9/2001 | Junius et al. | 248/442.2 |
| 6,349,915 | B1 * | 2/2002 | Jones et al. | 248/442.2 |
| 7,051,463 | B2 * | 5/2006 | Bing et al. | 40/341 |
| 7,240,444 | B1 * | 7/2007 | Rodriguez | 40/343 |
| 7,542,270 | B2 * | 6/2009 | Chen | 361/679.25 |
| 7,681,856 | B1 * | 3/2010 | Thomas et al. | 248/442.2 |
| 7,817,411 | B2 * | 10/2010 | Lee et al. | 361/679.25 |
| 7,823,856 | B2 * | 11/2010 | Schwartz et al. | 248/442.2 |
| 2005/0268508 | A1 * | 12/2005 | Bing et al. | 40/658 |

OTHER PUBLICATIONS

EPO Communication dated Aug. 29, 2017 for corresponding EPO Application No. 12 192 542.4-1972, citing Foreign Patent Document No. 1 above. 6 pages.

European Search Report dated Mar. 7, 2013 for corresponding EPO Application 12 192 542.4-1972, citing Foreign Patent Document No. 1 above, attached to Patent Publication EP 2592526 A1 (corresponding Application 12 192 542.4-1972).

* cited by examiner

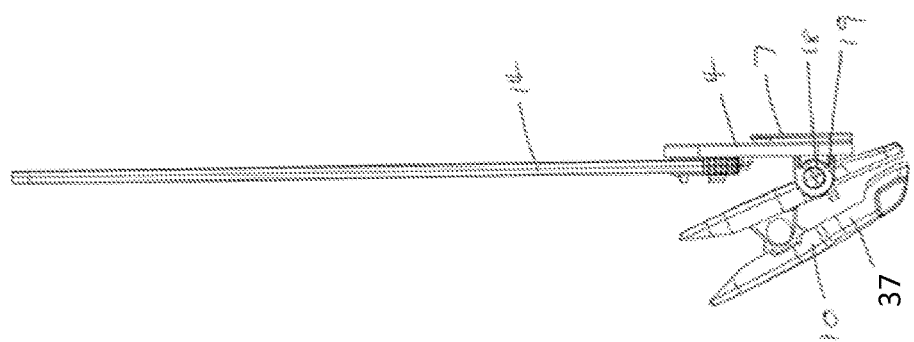

HOLDER FOR SUPPORTING MEDIA SHEET

CROSS-REFERENCE TO RELATED APPLICATIONS

This application claims priority to and the benefit of Australian Patent Application No. 2011904741 filed Nov. 14, 2011, the entire content of which is incorporated herein by reference.

FIELD

A holder for supporting media sheets in an easily observed state with respect to a monitor such as, for example, a computer monitor is disclosed.

BACKGROUND

Users of monitors such as computer monitors, video screens etc are aware of the need to affix media such as paper documents in an easy to view position with respect to the monitor.

SUMMARY

Disclosed in some forms is a holder for supporting one or more media sheets with respect to a monitor, the holder comprising a body a plurality of retainers, the retainers being configured such that in use a media sheet is biased by the retainer into contact with the body so as to be supported in facing relationship with the body and a connector adapted to connect the body with the monitor.

The holder allows a media sheet to be easily positioned in and supported by the holder such that the sheet can be observed.

The foregoing summary is illustrative only and is not intended to be in any way limiting. In addition to the illustrative aspects, embodiments, and features described above, further aspects, embodiments and features will become apparent by reference to the drawings and the following detailed description.

BRIEF DESCRIPTION OF THE DRAWINGS

Preferred embodiments of the disclosure will now be described by way of example only, with reference to the accompanying drawings in which;

FIG. 24 is a front view of the holder of FIG. 19.

DETAILED DESCRIPTION

Figure 1:
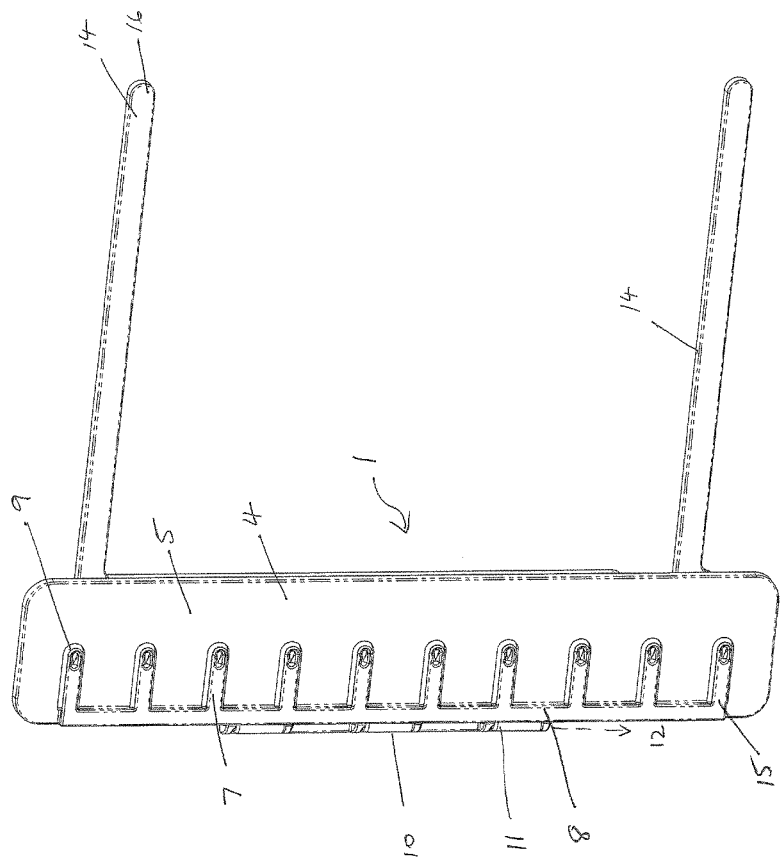
FIG. 1 is a front perspective view of a holder of one embodiment of the disclosure.
Figure 2:
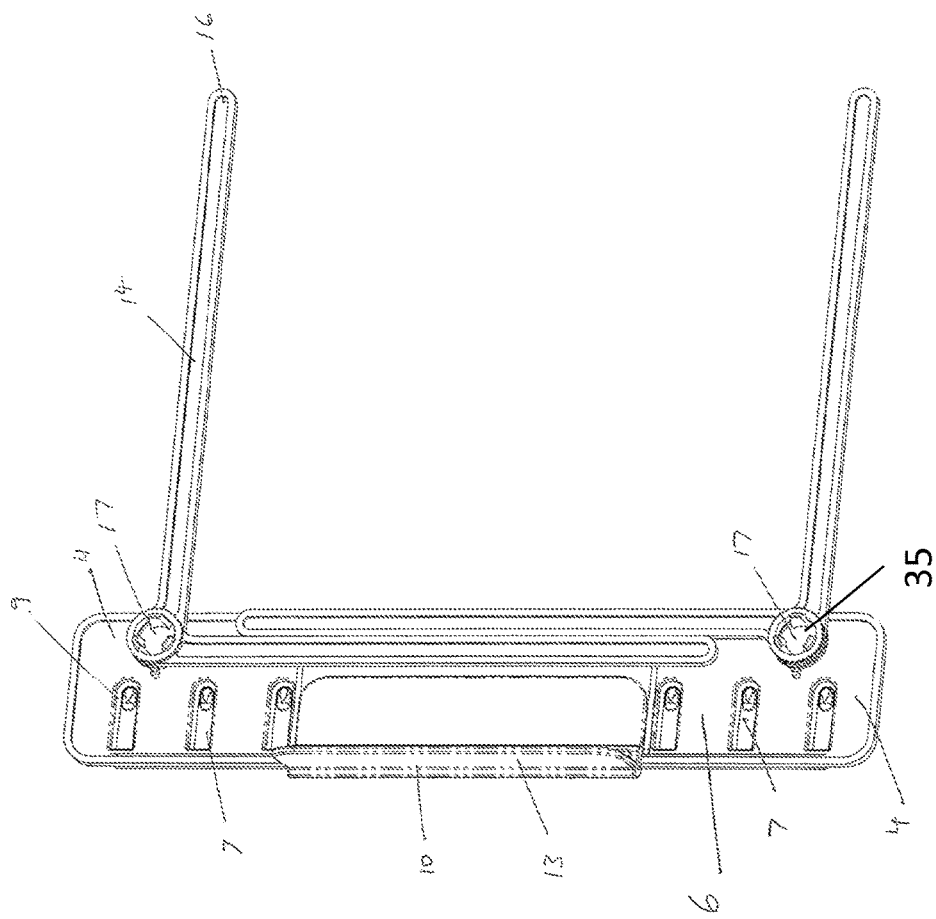
FIG. 2 is a rear perspective view of the holder of FIG. 1.
Figure 3:
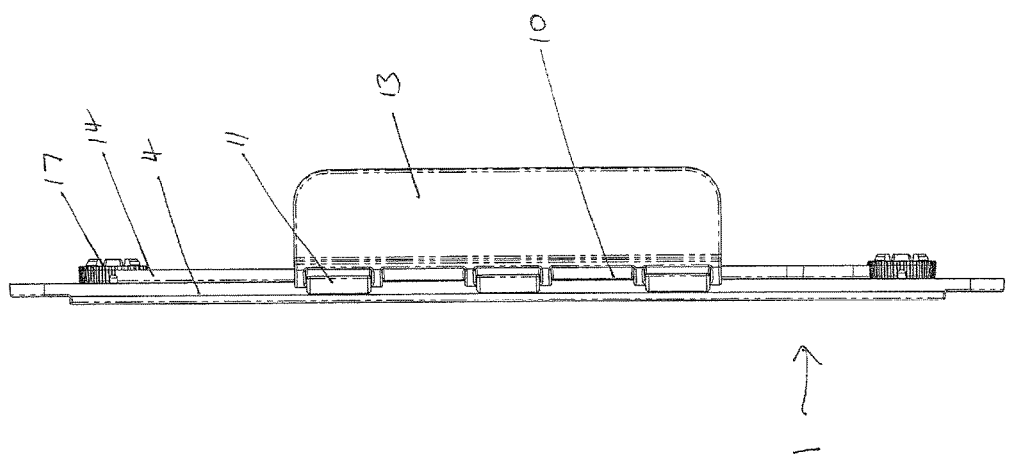
FIG. 3 is a side view of the holder of FIG. 1.
Figure 4:
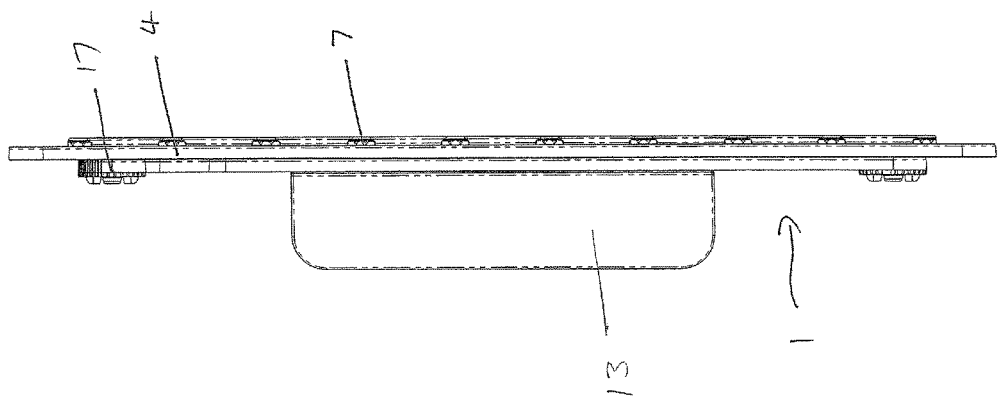
FIG. 4 is a side view of the holder of FIG. 1.
Figure 5:
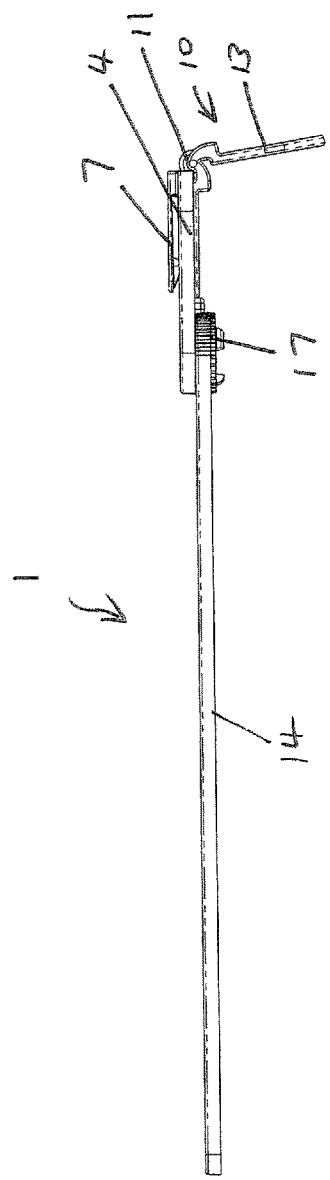
FIG. 5 is a top view of the holder of FIG. 1.
Figure 6:
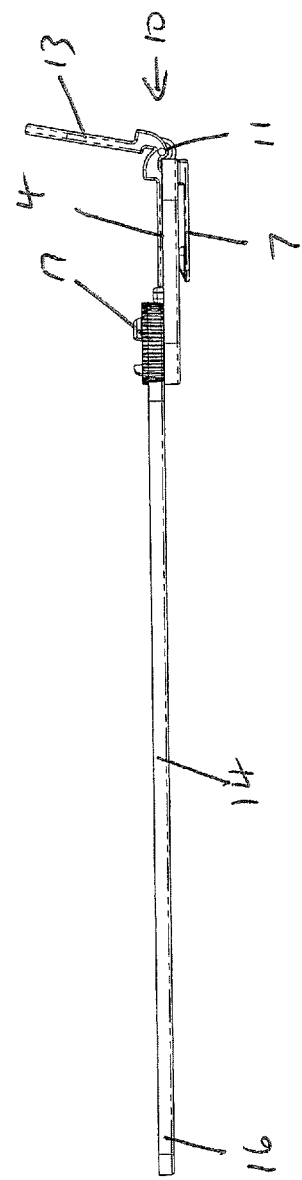
FIG. 6 is a bottom view of the holder of FIG. 1.
Figure 7:
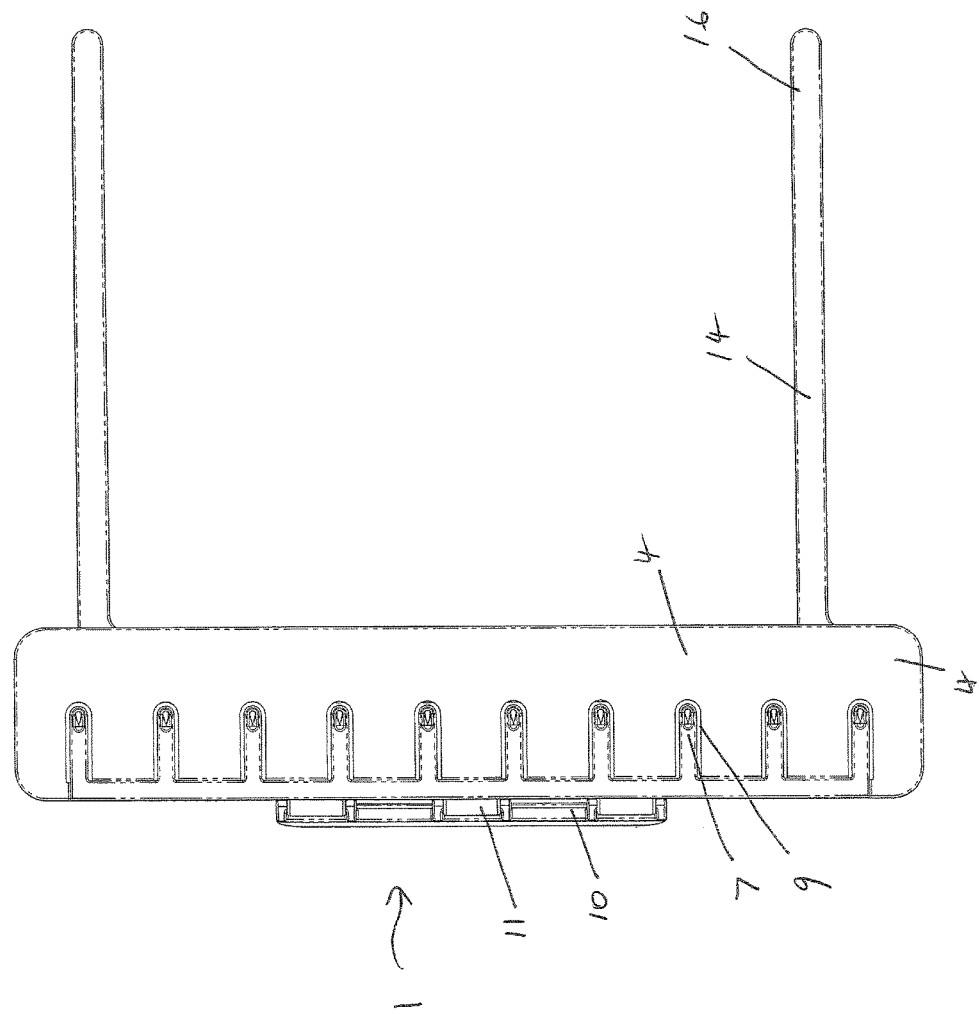
FIG. 7 is a front view of the holder of FIG. 1.
Figure 8:
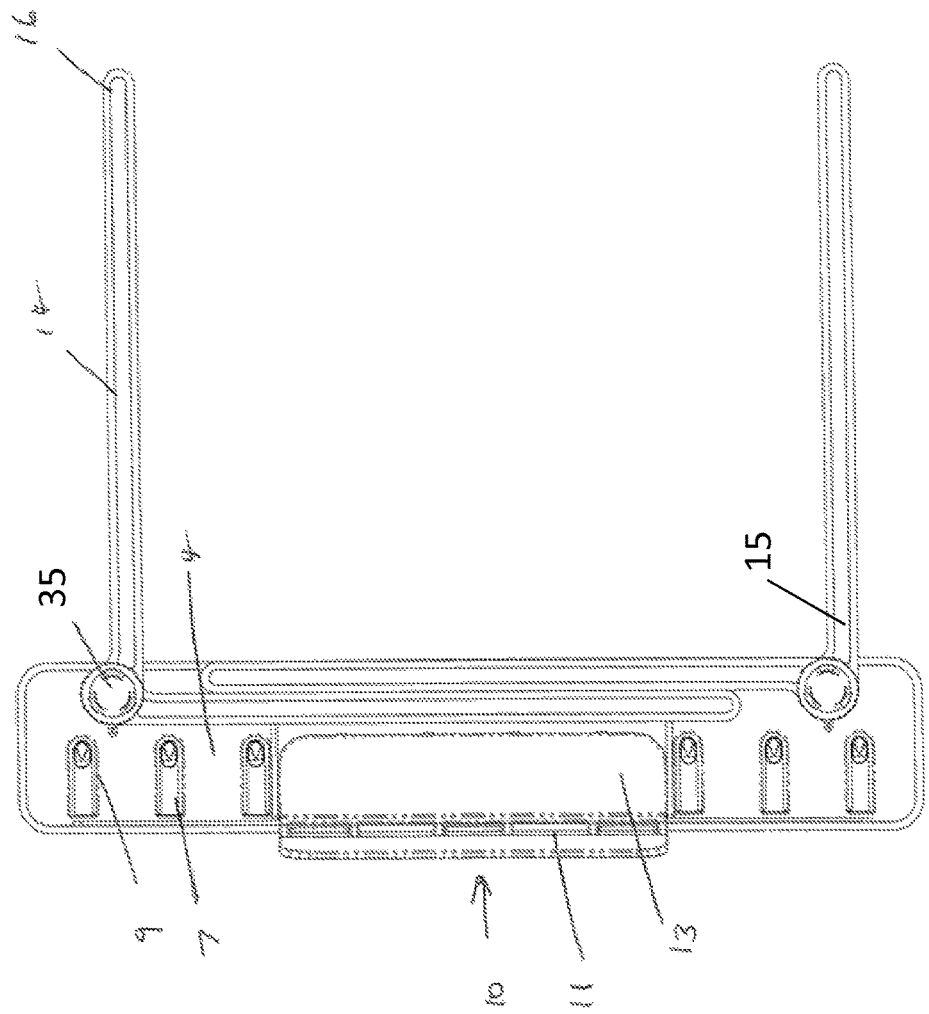
FIG. 8 is a rear view of the holder of FIG. 1.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

This disclosure is directed generally to a holder for supporting one or more media sheets with respect to a monitor or screen such as a computer monitor. Although the embodiments have been described with respect to a holder configured to connect with a computer monitor it will be clear that the holder can be utilised for affixing to alternative items such as television screens, video monitors, security monitors or even shelving, desks, storage cupboards or any item where a media sheet might need to be viewed.

In some forms disclosed is a holder for supporting one or more media sheets with respect to a monitor, the holder comprising a body a plurality of retainers, the retainers being configured such that in use a media sheet is biased by the retainer into contact with the body so as to be supported in facing relationship with the body a connector adapted to connect the body with the monitor.

In some forms the body includes a front surface and the retainers are configured such that in use a media sheet is biased by the retainer into contact with the front surface so as to be supported in facing relationship with the front surface.

In some forms the front surface is a substantially flat forward facing face.

In some forms the retainers are flexible. In some forms the retainers comprise a flexible polymer.

In some forms the flexion provided by the flexible material of the retainers is effective to bias the retainer toward the body. This bias results in a media sheet inserted between the retainer and the body being biased against the body which allows for the media sheet to be supported by the body.

In some forms the retainers comprise an extension extending across the body.

In some forms in use the retainers are configured to extend at an angle substantially perpendicular to the edge of the monitor.

In some forms the retainers define a retention cavity with the body.

In some forms the body includes a plurality of openings extending into the body from a front surface, the openings being aligned with the retainers.

In some forms the retainers are elongate.

In some forms the retainers are spaced apart along a length of the body.

In some forms the retainers extend such that they are substantially parallel to one another.

In some forms the connector is adapted to connect the body with an edge of the monitor.

The connector can be positioned at an edge of the monitor such that a media sheet supported by the holder is visible to a person viewing the monitor.

In some forms the connector extends along one side of the body.

In some forms the retainers extend across the body in a direction away from the connector.

In some forms the connector comprises adhesive.

In some forms the connector comprises one or more clips.

In some forms the connector is adapted to removably attach the body with a monitor.

In some forms the holder further comprises at least one arm extending outwardly from the body.

In some forms the arm is configured to support the media sheet, specifically by supporting the sheet distal to the side at which the sheet is supported by the body of the holder. This allows for a wider media sheet to be supported by the holder.

In some forms the or each arm is moveable between a support position in which the arm extends outwardly from the body and is configured to support a media sheet positioned in the holder and a retracted position.

In some forms in the retracted position the or each arm is aligned with the body.

In some forms the arm is moveable such that the holder can be packed into a compact form, allowing for storage and transport of the holder or allowing the holder to be take up less space when not in immediate use.

In some forms in the support position the arm extends away from the monitor. In some forms the arm is moveable to support a media sheet at a given angle and is positionable at any angle with respect to the body to allow for best support.

In some forms disclosed is a holder comprising a body having a front face and a rear face, a plurality of retainers extending across a portion of the front face and biased toward the body, and a magnet positioned in the rear face.

The holder of some forms of the disclosure allows for a media sheet of A4 or approximate equivalent size to be held vertically or horizontally with respect to the monitor and supported by the holder such that a user can view the sheet in a preferred orientation. Further, the holder of some forms of the disclosure allows for media to be supported on either side or on top of the monitor.

Figure 9:
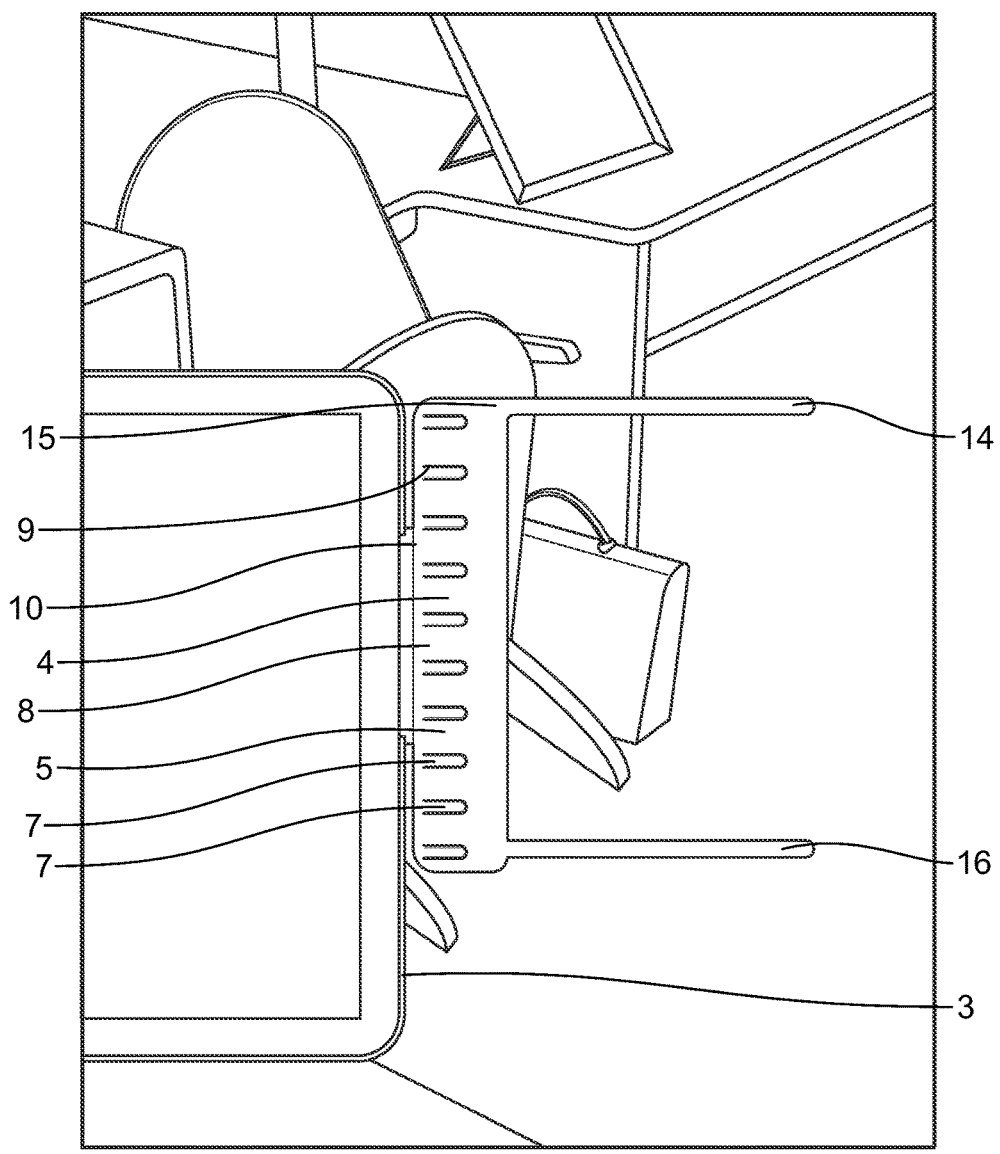
FIG. 9 is a front view of a holder of a second embodiment of the disclosure.
Figure 10:
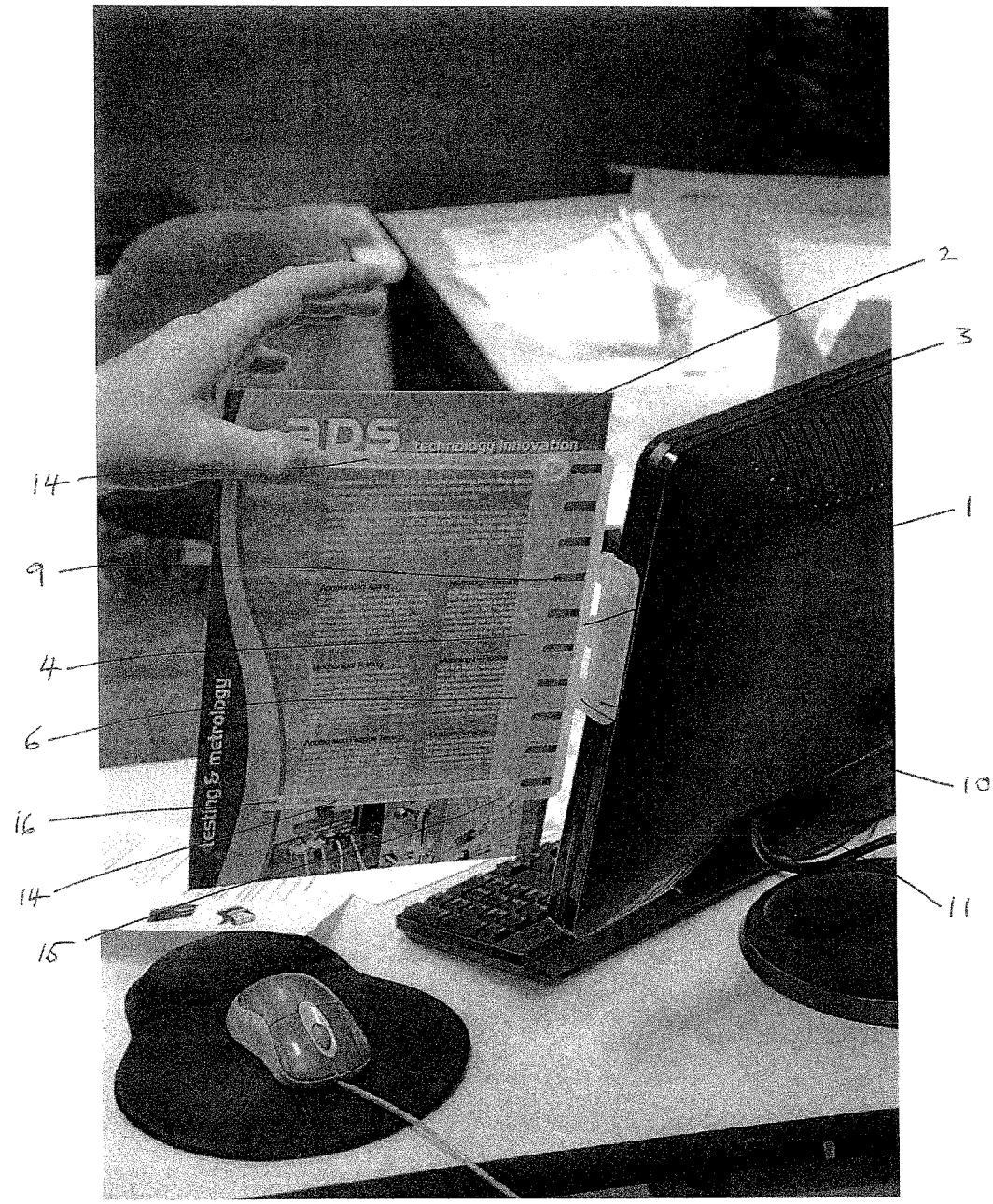
FIG. 10 is a rear view of the holder of FIG. 9.
Figure 11:
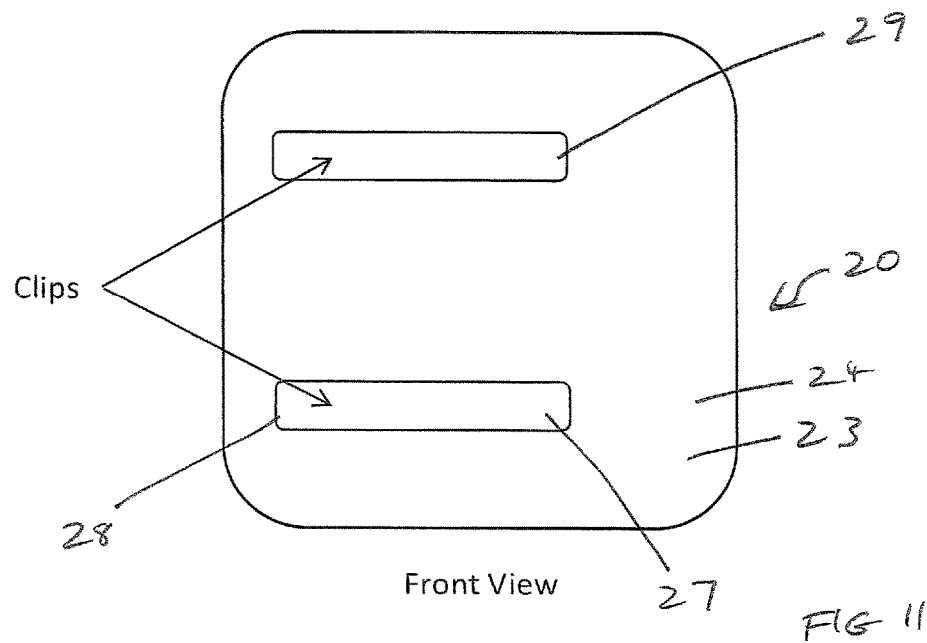
FIG. 11 is a front perspective view of a holder of a third embodiment of the disclosure.
Figure 12:
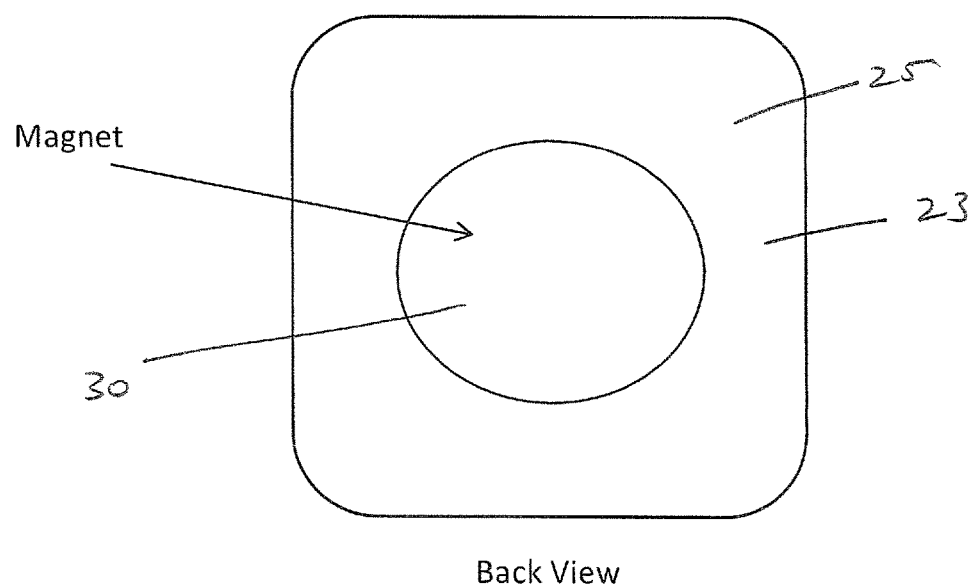
FIG. 12 is a rear view of the holder of FIG. 11.

Referring to FIGS. 1 through 10, disclosed is a holder 1 for supporting one or more media sheets 2 (as shown in FIGS. 9 and 10) in a state which is easily viewable with respect to a screen or monitor such as, in this case, a computer monitor 3. (as shown in FIGS. 9 and 10) The holder comprises a body 4 which in this form is elongate and comprises a front surface 5 and rear surface 6 in opposing relationship. The front surface 5 and rear surface 6 are, in this form, substantially flat and planar however it is envisaged that other surfaces would fall within the scope of the disclosure.

The elongate body 4 positions the centre of gravity of the holder 1 close to the clip 37 allowing for the clip 37 to successfully support the holder 1 with respect to the monitor 2.

In the illustrated form a plurality of retainers 7 extend across portion of the body. The retainers 7 extend from a spine 8 extending along an edge of the body 4. In alternative embodiments the spine may be broken or alternatively may be absent. The spine 8 acts such that a media sheet positioned under the retainer 7 abuts and is, in some cases, supported by the spine 8. In some forms the connected end 15 of the retainers 7 performs this purpose. The retainers extend from the spine across the front surface 5 of the body 4.

The retainers are composed of a flexible material such as, for example, a plastic, polymer or flexible metal.

In the illustrated form the body 4 includes a plurality of openings 9 extending through the body 4. The openings 9 are aligned with the retainers 7 such that a media sheet 2 inserted behind the retainer will form a slightly undulating path.

While the illustrated form includes a body 4 with openings 9 extending therethrough these openings could alternatively be absent or extend into the body 4 but not reach the rear surface 6 of the body 4.

The retainers are biased toward the body and are designed to maintain the media sheet pressed against the body to support the media sheet between the retainers 7 and the body 4. The retainers 7 are spaced apart along the front surface 5 of the body. In some forms the retainers are sufficiently spaced apart to allow easy visibility of a media sheet in the form of a document while providing sufficient support for the media sheet throughout the length of the media sheet.

The holder 1 further comprises a connector 10 which is configured to connect the body 4 with the monitor 3. In the illustrated form the connector removably connects the body 4 with an edge of the monitor 3 such that the holder extends along a side of the monitor. This side comprises either side edge or a top or bottom edge. This allows for a media sheet to be positioned in varying positions with respect to the monitor 3.

In the illustrated form the connector 10 is hinged by means of a hinge 11 with respect to the body 4 such that the body 4 is moveable about an axis 12 extending through the hinge 11. The body 4 can therefore be sloped for best viewing of a media sheet 2 supported by the holder 1.

In the illustrated form of FIGS. 1 through 10, the connector 10 comprises an adhesive. The adhesive is positioned on a flat connector surface 13 such that the connector can be adhered to a monitor. The adhesive is adapted to allow the connector to removably engage an edge surface of the monitor. In alternative embodiments the connector 10 could comprise one or more clips or any alternative known connection means such as interference fit, Velcro™, press fit, studs, pins or screws.

The holder further comprises one or more arms 14 extending from the body 4. In the illustrated form two arms 14 extend outwardly from the body and are hinged at a hinge point 35 such that they are moveable. The arms 14 are moveable between a retracted position (not illustrated) in which the arms 14 align with the body 4. In the illustrated form in the retracted position the arms 14 are positioned such that they are not visible from a position forwards of the body 4. The arms 14 are hinged about an arm hinge 17 which attaches the arms hingedly with the body 4. This position allows for easy storage of the holder. The arms are moveable to a supporting position in which a distal point 16 of the arms 14 is positioned away from the body 4 to support a distal portion of the media sheet. This allows for larger sheets such as A4 sheets to be supported by the holder.

In a not-illustrated embodiment the holder 1 includes a panel or section adapted for inclusion of advertising materials, banners or trade names or the like to allow for use as promotional material.

In use, the holder 1 is connected with a monitor 3 on any edge of the monitor 3. A media sheet 3 is positioned between the retainers 7 and the body 4 such that the retainers 7 act to bias the media sheet 2 into facing contact with the body 4 and the media sheet 2 is supported between the retainers 7 and the body 4. The arms 14 are rotated to extend outwardly from the body 4 such that a rear face of the media sheet is supported on the arms.

In the form illustrated in FIGS. 11 through 18, disclosed is a holder 1 for supporting one or more media sheets in a viewable position with respect to a monitor. The holder 1 comprises a body 4 having retainers 7 extending across the body 4.

In the form illustrated in FIGS. 11 through 18, the holder further comprises a connector 10 configured to allow a user to affix the holder 1 to the monitor. The connector 10 comprises a heavy duty clamp clip 37 which is hingedly attached with the body 4 such that body 4 is moveable to be angled with respect to the clip 37.

In the illustrated form the clip 37 comprises clamp arms biased into a closed position with respect to one another. In the illustrated form the clip comprises a bull dog or similar clip.

In use, a user attaches the clip 37 to a side or top of the monitor. The clip 37 is able to support the body 4 and arms 14 with respect to the monitor. The clip is configured to rotate about a y-axis extending longitudinally along one edge or through the centre of the elongate body 4.

In some forms the clip supports rotation about an x axis extending laterally through the body. The combination of longitudinal and lateral rotation allows the body to be positioned for best comfort and clarity for a user.

Figure 13:
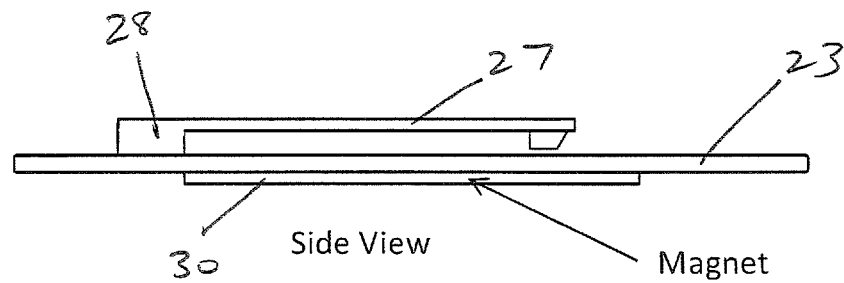
FIG. 13 is a top view of the holder of FIG. 11.
Figure 14:
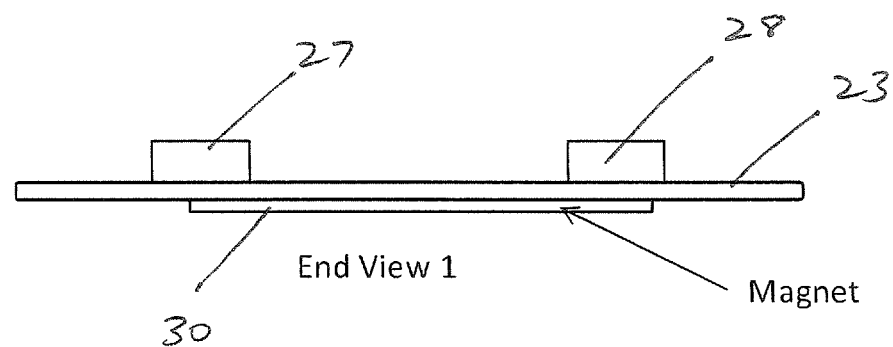
FIG. 14 is a front view of the holder of FIG. 11.
Figure 15:
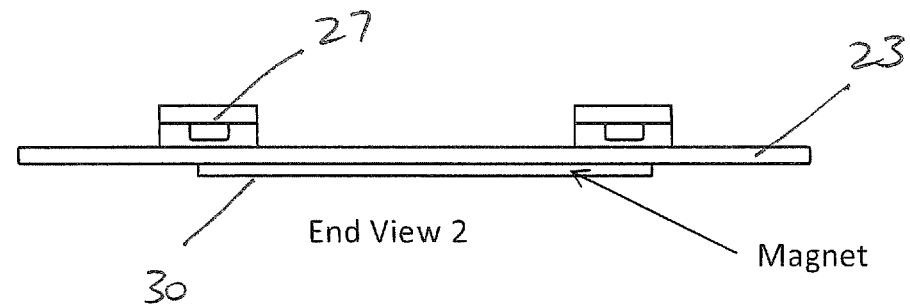
FIG. 15 is a side view of the holder of FIG. 11.
Figure 16:
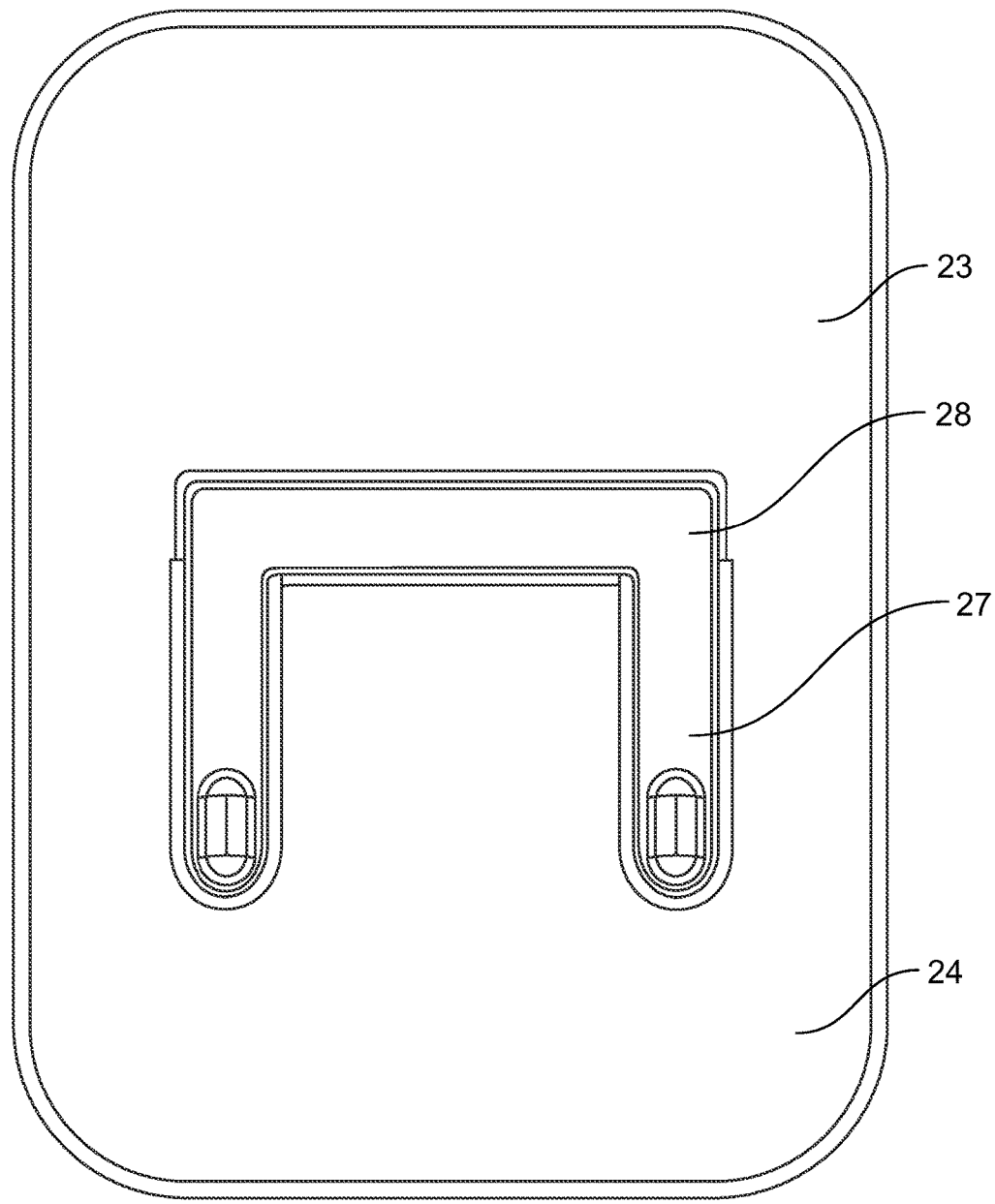
FIG. 16 is a rear perspective view of the holder of FIG. 11.
Figure 17:
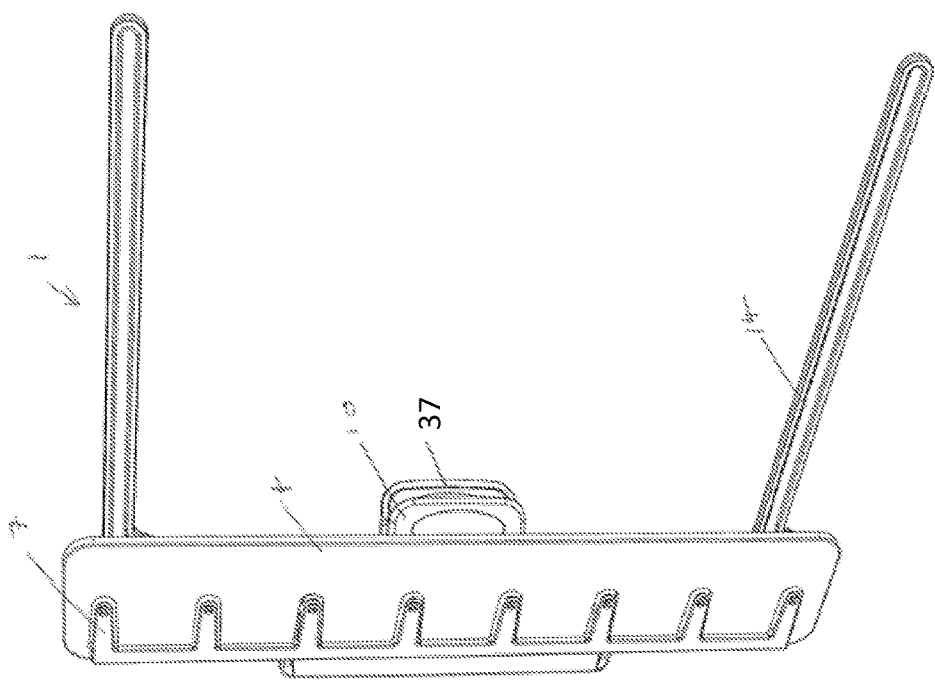
FIG. 17 is a side view of the holder of FIG. 11.
Figure 18:
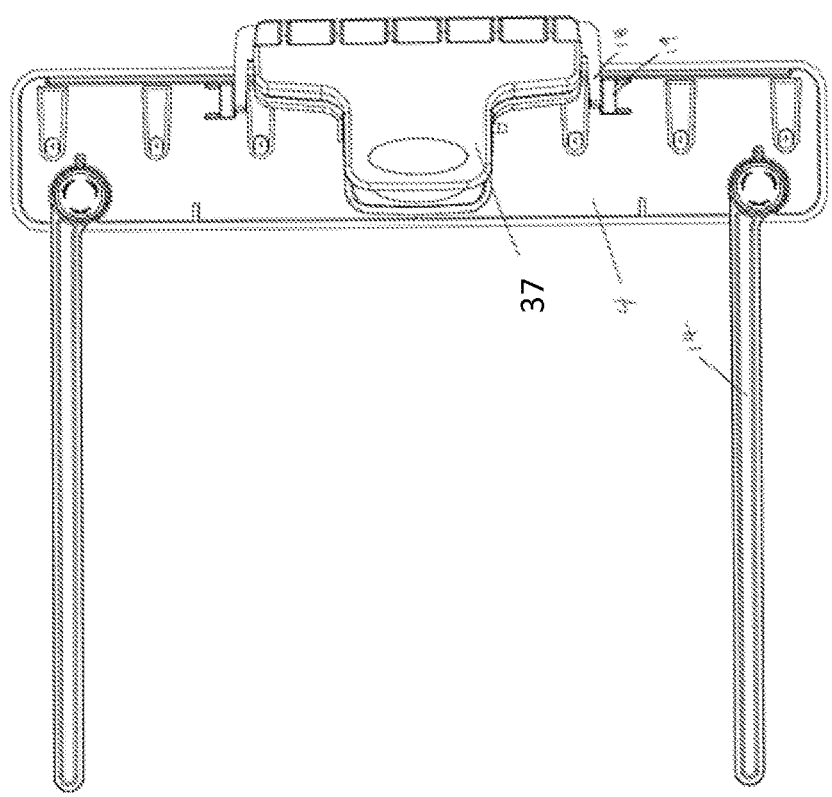
FIG. 18 is a bottom view of the holder of FIG. 11.
Figure 19:
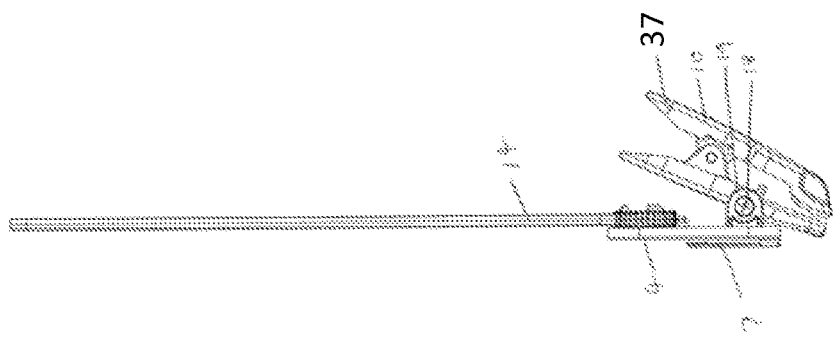
FIG. 19 is a front view of a third embodiment of a holder.
Figure 20:
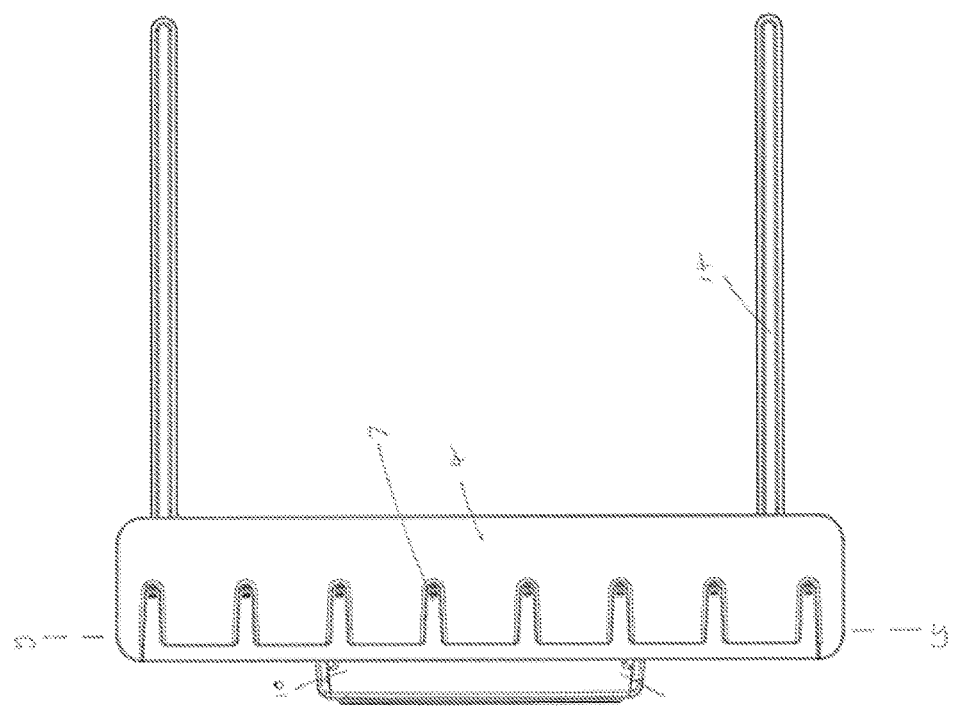
FIG. 20 is a rear view of the holder of FIG. 19.
Figure 21:
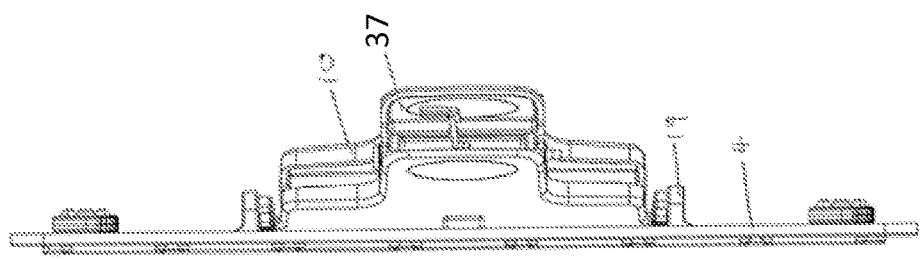
FIG. 21 is a side view of the holder of FIG. 19.
Figure 22:
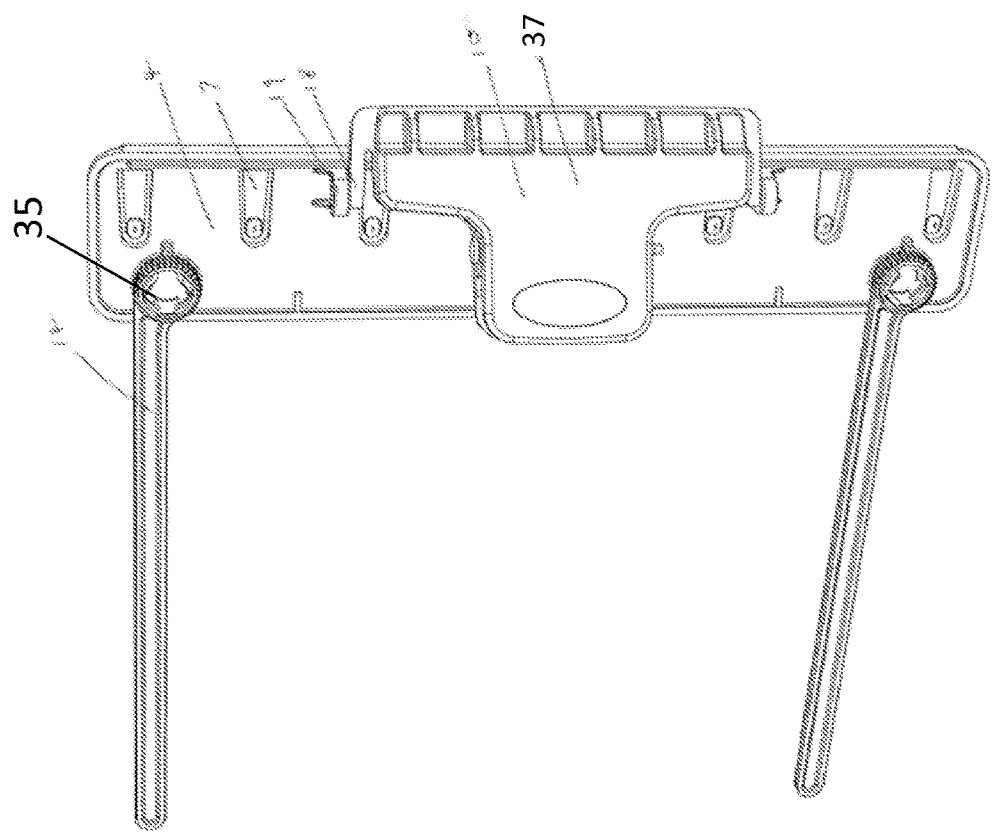
FIG. 22 is a top view of the holder of FIG. 19.
Figure 23:
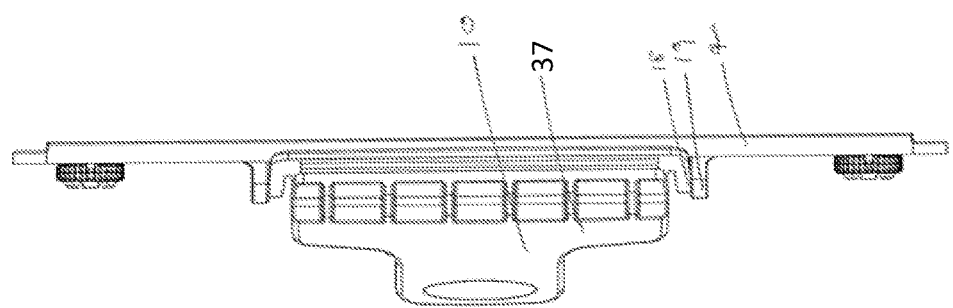
FIG. 23 is a bottom view of the holder of FIG. 19.

As shown in FIG. 13, the clip 37 is engaged with the body 4 by means of an engagement element 18 which extends from the clip 37 and is inserted into engagement cavity 19.

In some forms the clip 37 is removable such that the holder can be utilised with different monitors.

In some not-illustrated forms the holder comprises two or more clips adapted to engage the monitor.

In some further forms as illustrated in FIGS. 19 through 24, the holder comprises a magnet 20 adapted to support a media sheet (not illustrated) in relation to a metallic object. The magnet 20 comprises a body 23 which includes a front surface 24 and a rear surface 25. The magnet further comprises a plurality of retainers 27 extending across the front surface 24 of the body 23. The retainers extend from a connection point 28 to a distal point 29 and define a retention cavity between the retainers 27 and the front surface 24. The retainers in the illustrated form are flexible. A media sheet inserted between the retainers 27 and the front surface 24 are supported by the body 23 and the retainers 27 and are held in position with respect to the magnet 20 by being biased against the front surface 24 by action of the retainers 27.

A magnet member 30 is incorporated into the rear surface 25 of the magnet 20.

While the holder has been described in reference to its preferred embodiments, it is to be understood that the words which have been used are words of description rather than limitation and that changes may be made without departing from its scope as defined by the appended claims.

In the claims which follow and in the preceding description of the note holder, except where the context requires otherwise due to expressed language or necessary implication, the word "comprise" or variations such as "comprises" or "comprising" is used in an inclusive sense, that is to specify the presence of the stated features but not to preclude the presence or addition of further features in various embodiments of the note holder.

Variations and/or modifications may be made to the parts previously defined without departing from the broad spirit or ambit of the note holder.

The invention claimed is:

1. A holder for supporting one or more media sheets with respect to a monitor, the holder comprising:
   an elongate body extending along a longitudinal axis, the body having a planar front surface;
   a plurality of retainers in the form of tines extending from the body and substantially parallel with but in a separate plane from the planar front surface of the body to define at least one insertion cavity with planar front surface, said insertion cavity extending from a closed end at which the retainer is attached with the body to an open end, the closed end being spaced apart from the open end in a plane extending perpendicular to the longitudinal axis, the retainers being configured such that in use when one of the one or more media sheets is positioned in the insertion cavity said one or more media sheets are biased by the plurality of retainers into contact with the planar front surface of the body so as to be supported in facing relationship with the body; and,
   a connector having at least one connector surface that adheres to the monitor or is biased to engage with the monitor,
   wherein the holder is configured such that the body extends longitudinally along an edge of the monitor and the retainers are sufficiently narrow and spaced apart to allow easy visibility of the media sheet when inserted into the insertion cavity; and
   wherein the body includes a spine extending along an edge of the body such that at least a portion of the spine forms the closed end of the insertion cavity and, in use, an edge of one of the one or more media sheets abuts the closed end of the insertion cavity and abuts the spine.

2. A holder for supporting one or more media sheets with respect to a monitor, the holder comprising:
   an elongate body extending along a longitudinal axis, the body having a planar front surface;
   a plurality of retainers in the form of tines extending from the body and substantially parallel with but in a separate plane from the planar front surface of the body to define at least one insertion cavity with planar front surface, said insertion cavity extending from a closed end at which the retainer is attached with the body to an open end, the closed end being spaced apart from the open end in a plane extending perpendicular to the longitudinal axis, the retainers being configured such that in use when one of the one or more media sheets is positioned in the insertion cavity said one or more media sheets are biased by the plurality of retainers into contact with the planar front surface of the body so as to be supported in facing relationship with the body; and,
   a connector having at least one connector surface that adheres to the monitor or is biased to engage with the monitor,
   wherein the holder is configured such that the body extends longitudinally along an edge of the monitor and the retainers are sufficiently narrow and spaced apart to allow easy visibility of the media sheet when inserted into the insertion cavity; and further comprising at least one arm, the at least one arm extending from the body and substantially parallel with the retainers and beyond the retainers to provide additional support to a media sheet inserted in the insertion cavity.

3. A holder as defined in claim 2, wherein the at least one arm is rotatable between a collapsed position in which the at least one arm extends in line with the body and perpendicular to the retainers and an extended position in which the at least one arm extends from the body and substantially parallel with the retainers.

* * * * *